UNITED STATES PATENT OFFICE.

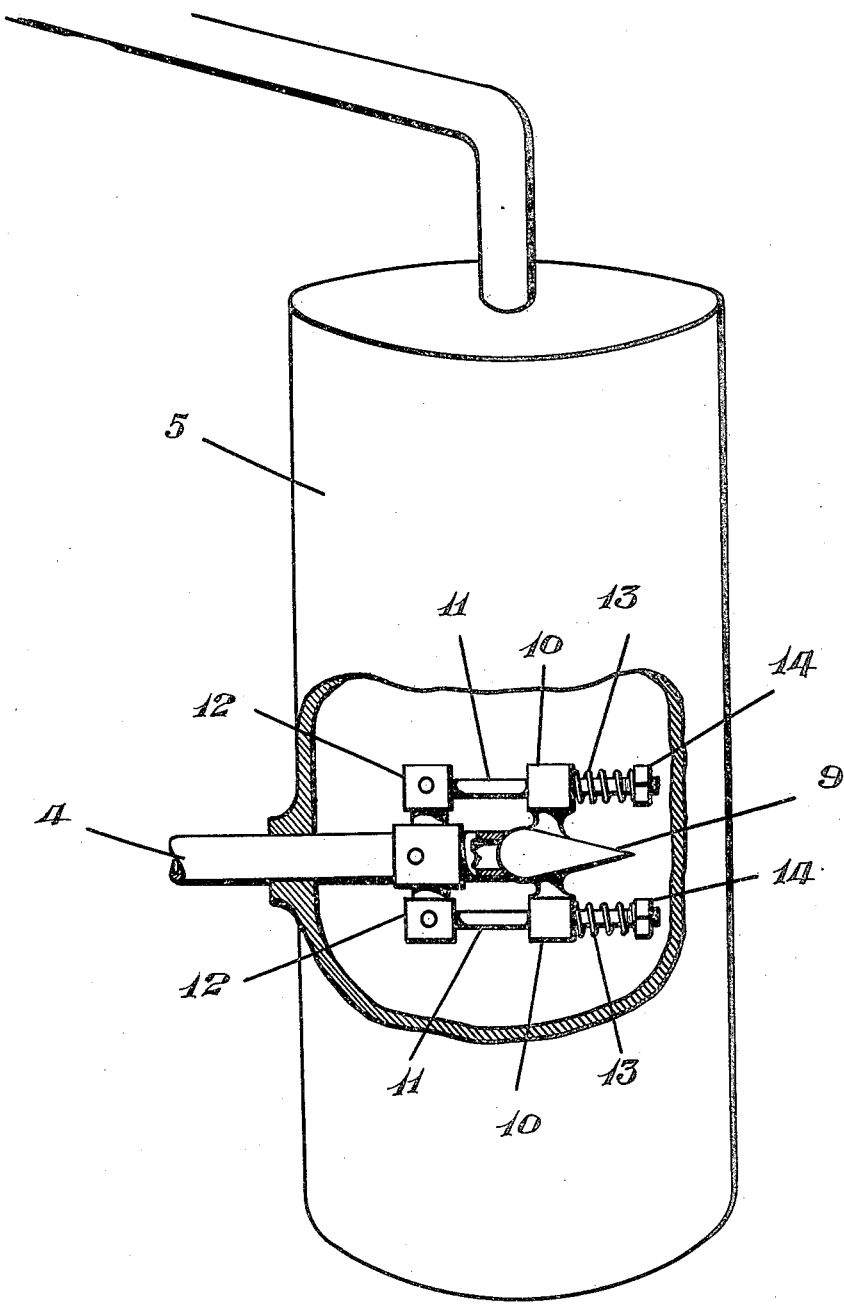

THOMAS W. THAXTON, OF MUNCIE, INDIANA, ASSIGNOR OF ONE-HALF TO CASPER L. BACON, OF MUNCIE, INDIANA.

VALVE.

1,407,358. Specification of Letters Patent. Patented Feb. 21, 1922.

Application filed April 19, 1920. Serial No. 375,118.

*To all whom it may concern:*

Be it known that I, THOMAS W. THAXTON, a citizen of the United States, residing at Muncie, in the county of Vermilion and State of Indiana, have invented certain new and useful Improvements in Valves; and I do hereby declare the following to be a full, clear, and exact description of the invention, such as will enable others skilled in the art to which it appertains to make and use the same.

The present invention relates to valves and the object is the provision of a novel and improved valve for admitting air from an air compressor or pump to a storage tank, and preventing the reverse flow, and which will be sensitive in its operation.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein the figure is a perspective view showing the valve, portions being shown in section.

In the arrangement shown, the valve device is used on a pipe 4 leading from an air compressor (not shown) into an air storage tank 5, from which the discharge pipe 7 leads.

A valve 9 is provided for closing the end of the pipe 4 within the tank 5, said valve being rounded at one end to seat against the end of the pipe, and the valve tapering to a point at the opposite end. The valve is carried by a cross head 10, the end portions of which are slidable on guide rods 11 at opposite sides of the valve 9 and pipe 4. Said rods 11 are secured to a bracket 12 mounted on the pipe, and coiled expansion springs 13 surround said rods and are confined between the cross head and nuts 14 screw threaded on the free terminals of said rods. Said springs seat the valve 9 by sliding the cross head 10 toward the pipe, and due to the shape of the valve, it will unseat easily for admitting compressed air from the pipe 4 delivered from the air compressor into the tank, the springs 13 causing the valve to seat instantly when the flow of compressed air into the tank is stopped, so as to avoid the reverse flow of air from the tank into the pipe 4 and air compressor. This provides a sensitive check valve for the end of the pipe 4.

Having thus described the invention, what is claimed as new is:—

A valve construction comprising a pipe having a valve seat at the end thereof, guide rods carried by said pipe and projecting beyond said end thereof, a cross head slidable on said rods, a valve carried by said cross head and having a rounded portion to bear against said seat, adjustable members on said rods at that side of the cross head opposite to the pipe, and expansion springs on said rods between said members and cross head and capable of individual adjustment in tension by the adjustment of said members.

In testimony whereof I have signed my name to this specification in the presence of two subscribing witnesses.

THOMAS W. THAXTON.

Witnesses:
CASPER L. BACON,
ELMER E. BOTKIN.